April 23, 1935.   H. F. D. DAVIS   1,998,450
THRUST MEASURING APPARATUS
Filed Feb. 4, 1932
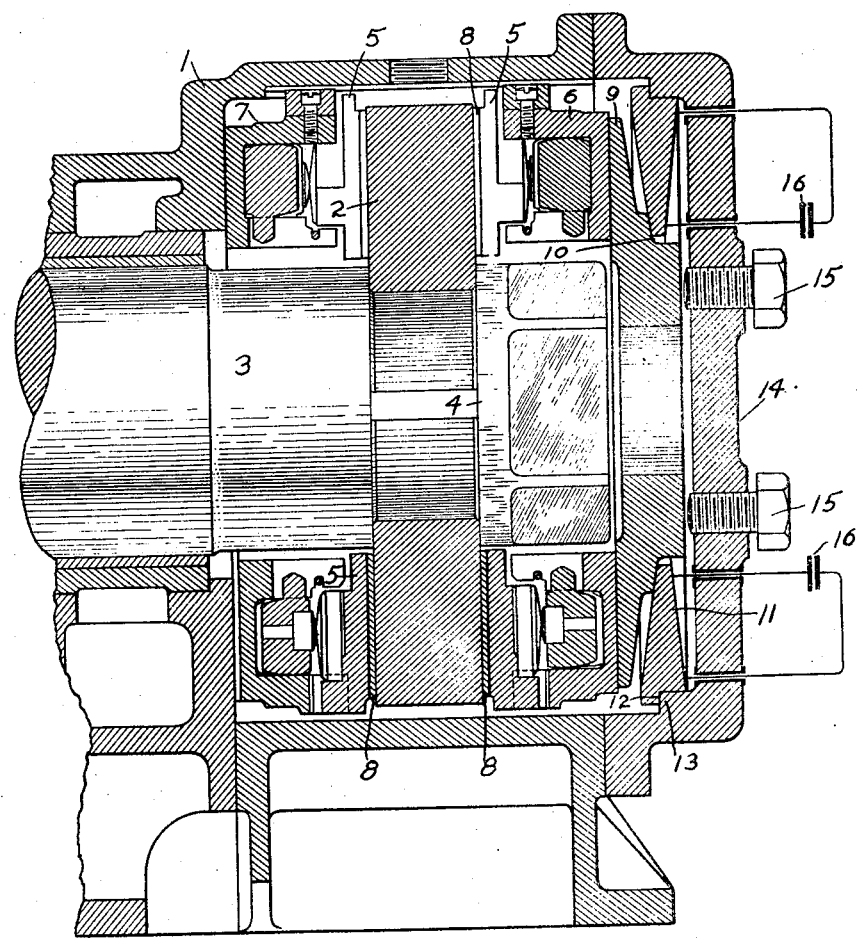
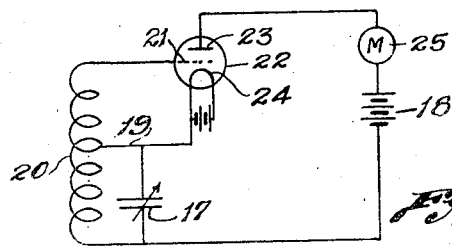
HENRY F. D. DAVIS
INVENTOR
BY
ATTORNEY Patented Apr. 23, 1935

1,998,450

UNITED STATES PATENT OFFICE 1,998,450

THRUST MEASURING APPARATUS

Henry F. D. Davis, United States Navy

Application February 4, 1932, Serial No. 590,949

4 Claims. (Cl. 265—1)

(Granted under the act of March 3, 1883, as amended April 30, 1928; 370 O. G. 757)

This invention relates to means for measuring the axial thrust on rotating shafts and is shown as specifically applied to the propeller shaft of a ship.

The object of my invention is to provide apparatus for measuring accurately the axial thrust on shafts by multiplying many times the relatively slight movements of parts that carry the thrust.

With the above and other objects in view, the invention consists in the construction, combination and arrangement of parts as will be described more fully hereinafter.

Figure 1 of the drawing shows my invention applied to a shaft acting against the well-known Kingsbury thrust bearing.

Figure 2 shows one form of circuit that will be employed to measure the deflection of the elastic element.

There have heretofore been mechanisms designed to measure the thrust of a ship's propeller shaft, but those with which I am acquainted have been adapted to experimental use only and not practical for sea-going vessels, and in addition they have required the continuous operation of a powerful motor to drive an oil pump, which makes them unduly expensive and impractical.

Thrust block 1 houses the Kingsbury thrust bearing, comprising collar 2 secured to propeller shaft 3 by a nut 4 and bearing against the tilting thrust shoes 5 mounted in the base rings 6 and 7 in the usual manner. Shoes 5 are provided with anti-friction surfaces 8.

A supporting ring 9 bears against the base ring 6 and is provided on its outer surface with a sloping annular face 10. Radially tapered annular spring 11 is disposed with a portion of one face adjacent its inner edge bearing against the face 10 on supporting ring 9 and with the rabbet 12 in its outer periphery engaging shoulder 13 on the inner face of cover plate 14. The engaging surfaces of the rabbet are sufficiently large to prevent bodily movement or tilting of spring 11 when thrust from shaft 3 is exerted against the radially inner edge of the spring through supporting ring 9. Stud bolts 15 are provided in cover plate 14 to be screwed against ring 9 to relieve spring 11 of the thrust when desired.

The means for measuring the deflection of the inner edge of spring 11 is shown schematically as a plurality of variable condensers 16 so mounted that deflection of the inner edge of the ring displaces the movable plates of the condensers and thus changes their capacity. These changes can be measured and the apparatus calibrated to show the deflections of the edge of the ring. Even minute changes of capacity can be observed by amplifying the effects of the capacitance changes by well known thermionic amplifying devices, which may be connected to a suitable meter or recording oscillograph. A circuit for this purpose is shown by way of illustration in Figure 2, wherein the sum of the capacities of condensers 16 is represented by variable condenser 17 connected to the negative lead of plate battery 18 and to tap wire 19 from inductance 20 to the grid 21 of tube 22, whereof the plate is designated by 23 and the filament by 24. The meter 25 may be calibrated to read thrust directly.

It is obvious that when the thrust of the shaft 3 is applied to the inner edge of spring 11, that edge will be flexed outwardly and move the plates of the condensers, causing a change in capacity proportional to the deflection, and hence giving a measure of the thrust. A plurality of condensers are connected to spring 11 in circumferentially spaced relation to insure obtaining of a reading of the mean deflection of the inner edge of the spring and thereby avoid error being introduced by possible unequal displacement at some particular sector of the spring.

While the means for measuring the movement of the inner edge of the spring is shown as being an electrical device, it is obvious that mechanical means, such as a system of multiplying levers, could also be used for that purpose.

It will be understood that the above description and accompanying drawing comprehend only the general and preferred embodiment of my invention, and that various changes in construction, proportion and arrangement of parts may be made within the scope of the appended claims, without sacrificing any of the advantages of this invention.

The invention herein described may be manufactured and used by or for the Government of the United States for governmental purposes without the payment of any royalties thereon.

I claim:

1. In combination with a drive shaft and a thrust bearing associated therewith housed in the thrust block, a supporting ring mounted against a portion of said bearing to receive the thrust of said shaft, said ring having a sloping annular face on its outer surface, a radially tapered annular spring disposed with a portion of one face adjacent its inner edge bearing against said face on the said ring, the said spring having an outwardly facing rabbet in its outer periphery, an end plate secured to said thrust block, said end plate having a substantially cylindrical side portion with an inwardly facing shoulder thereon seated in the rabbet in said spring, whereby the thrust stresses are transmitted from said ring to said cylindrical portion, and means to measure the lateral movement of the inner edge of said spring due to the thrust.

2. In combination with a drive shaft and a thrust bearing associated therewith housed in the thrust block, a supporting ring mounted against a portion of said bearing to receive the thrust of said shaft, said ring having a sloping annular face on its outer surface, a radially tapered annular spring disposed with a portion of one face adjacent its inner edge bearing against said face on the said ring, the said spring having an outwardly facing rabbet in its outer periphery, an end plate secured to said thrust block, said end plate having a substantially cylindrical side portion with an inwardly facing shoulder thereon seated in the rabbet in said spring, whereby the thrust stresses are transmitted from said ring to said cylindrical portion, means to measure the lateral movement of the inner edge of said spring due to the thrust, and means optionally operable to take said thrust and remove the stress from said spring.

3. In combination with a drive shaft and a thrust bearing associated therewith mounted in a thrust block, a member disposed in said block to receive the thrust of said shaft and to be moved thereby, an end plate secured to said block, said plate having a cylindrical side wall with an inwardly facing shoulder, an annular elastic element having at its outer edge a rabbet in which said shoulder is seated and having an annular portion of one face adjacent its inner edge in contact with said member to receive thrust from said member and transmit said thrust to said side wall, and means to measure the lateral deflection of said inner edge due to the thrust.

4. In combination with a drive shaft and a thrust bearing associated therewith mounted in a thrust block, a member disposed in said block to receive the thrust of said shaft and to be moved thereby, an end plate secured to said block, said plate having a cylindrical side wall with an inwardly facing shoulder, an annular elastic element having at its outer edge a rabbet in which said shoulder is seated and having an annular portion of one face adjacent its inner edge in contact with said members to receive thrust from said member and transmit said thrust to said side wall, means to measure the lateral deflection of said inner edge due to the thrust, and means optionally operable to take said thrust and remove the stress from said spring.

HENRY F. D. DAVIS.